United States Patent
Ge et al.

(10) Patent No.: US 9,241,061 B2
(45) Date of Patent: Jan. 19, 2016

(54) CELL PHONE PERIPHERAL DEVICE, COMMUNICATION TERMINAL AND METHOD FOR A CELL PHONE PERIPHERAL DEVICE COMMUNICATING WITH A CELL PHONE

(75) Inventors: Jinchun Ge, Guangdong (CN); Liang Liang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1718 days.

(21) Appl. No.: 11/625,373

(22) Filed: Jan. 22, 2007

(65) Prior Publication Data
US 2007/0191002 A1    Aug. 16, 2007

Related U.S. Application Data

(63) Continuation of application No. PCT/CN2005/000957, filed on Jun. 30, 2005.

(30) Foreign Application Priority Data

Jul. 22, 2004  (CN) .......................... 2004 1 0054822

(51) Int. Cl.
*H04W 4/00* (2009.01)
*H04M 1/725* (2006.01)
*H04M 1/60* (2006.01)

(52) U.S. Cl.
CPC ........ *H04M 1/7253* (2013.01); *H04M 1/72516* (2013.01); *H04M 1/6058* (2013.01); *H04M 2250/02* (2013.01)

(58) Field of Classification Search
CPC . G07F 17/32; G07F 17/3209; G07F 17/3202; G07F 17/3227; H04N 21/4223; H04M 1/6041; H04M 2250/02; H04M 2250/52; H04M 1/04; H04M 1/0258; H04M 1/0274; H04M 1/2535; H04M 1/6033; H04M 2250/04

USPC ............... 455/557, 556.1, 41.3, 422.1, 575.1, 455/420, 462, 550.1, 575.2, 90.3, 569.1; 370/521, 465; 340/636.1; 704/235
See application file for complete search history.

(56) References Cited

U.S. PATENT DOCUMENTS

| | | | |
|---|---|---|---|
| 2001/0002211 A1 | 5/2001 | Lee et al. | |
| 2001/0046872 A1* | 11/2001 | Masuda | ........................ 455/502 |

(Continued)

FOREIGN PATENT DOCUMENTS

| | | |
|---|---|---|
| CN | 1321267 | 11/2001 |
| CN | 1337607 | 2/2002 |

(Continued)

OTHER PUBLICATIONS

European Search Report: dated Jun. 4, 2009; Appln. No./Patent No. 05766707.3-2414 /1770976 PCT/CN2005000957.

(Continued)

*Primary Examiner* — Fred Casca
(74) *Attorney, Agent, or Firm* — Leydig, Voit & Mayer, Ltd.

(57) ABSTRACT

A cell phone peripheral device comprises a communication unit, for short-distance wireless communicating between said cell phone peripheral device and the cell phone; a processing unit, for receiving information from said communication unit, processing the information to obtain and analyze data information; a display unit, for receiving and displaying said data information. A method for a cell phone perpheral device communicating with a cell phone comprises receiving information from the cell phone by way of short-distance wireless communication; processing the information to obtain and analyze data information; and displaying, by the cell phone peripheral device, the data information. And a communication terminal comprises: a first communication unit for communicating with a cellular network, a processing unit, and a first input/output unit, and further comprising: a second communication unit, for transmitting voice and data information between the processing unit and the first input/output unit by way of short distance wireless communication.

10 Claims, 2 Drawing Sheets

(56) References Cited

U.S. PATENT DOCUMENTS

| | | | | |
|---|---|---|---|---|
| 2002/0091956 | A1* | 7/2002 | Potter et al. | 713/324 |
| 2003/0033452 | A1* | 2/2003 | Himmel et al. | 710/9 |
| 2003/0089291 | A1* | 5/2003 | Kanno et al. | 114/144 A |
| 2004/0228476 | A1* | 11/2004 | Denninghoff | 379/428.02 |
| 2004/0233789 | A1* | 11/2004 | Oguchi et al. | 368/47 |
| 2005/0003833 | A1* | 1/2005 | Younis | 455/456.1 |
| 2005/0208893 | A1* | 9/2005 | Yueh | 455/41.2 |

FOREIGN PATENT DOCUMENTS

| | | |
|---|---|---|
| CN | 2514575 | 10/2002 |
| CN | 1409566 | 4/2003 |
| CN | 2558176 | 6/2003 |
| EP | 1 032 186 A2 | 8/2000 |
| EP | 1 056 260 A2 | 11/2000 |
| EP | 1 213 896 A1 | 6/2002 |

OTHER PUBLICATIONS

Second Office Action of the State Intellectual Property Office of the PRC dated Apr. 30, 2010, for Application No. 200710101550.2, Huawei Technologies Co. Ltd., 4 pgs.

Third Office Action of the State Intellectual Property Office of the PRC dated Aug. 20, 2010 for Application No. 200710101550.2, Huawei Technologies Co. Ltd., 5 pgs.

Communication from the EPO pursuant to Rule 115(1) EPC issued May 26, 2010 for Application No. 05766707.3, Huawei Technologies Co. Ltd., 7 pgs.

Chinese Office Action dated (mailed), Jan. 26, 2011, issued in related Chinese Application No. 200710101550.2 Huawei Tech Co., LTD.

English translation of the PCT Written Opinion of the International Searching Authority for International Application No. PCT/CN2005/000957, mailed Oct. 20, 2005, 3 pgs.

European Patent Office Communication pursuant to Article 94(3) EPC for Application No. 05 766 707.3, dated Feb. 26, 2010, 7 pgs.

First Office Action of the State Intellectual Property Office of the PRC for Application No. 200710101550.2, dated Nov. 13, 2009, 4 pgs., English translation attached.

First Office Action of the State Intellectual Property Office of the PRC for Application No. 200410054822.4, dated Jul. 6, 2007, 5 pgs., English translation attached.

Second Office Action of the State Intellectual Property Office of the PRC for Application No. 200410054822.4, dated Oct. 26, 2007, 4 pgs., English translation attached.

Third Office Action of the State Intellectual Property Office of the PRC for Application No. 200410054822.4, dated Mar. 28, 2008, 6 pgs., English translation attached.

\* cited by examiner

CELL PHONE PERIPHERAL DEVICE, COMMUNICATION TERMINAL AND METHOD FOR A CELL PHONE PERIPHERAL DEVICE COMMUNICATING WITH A CELL PHONE

FIELD OF THE INVENTION

The present invention relates to the filed of wireless communications, and more particularly, to a cell phone peripheral device, a communication terminal, and a method for a cell phone peripheral device communicating with a cell phone.

BACKGROUND OF THE INVENTION

Along with the wide use of cell phones (also referred as mobile terminal) and the rapid development of integrated circuit, the functions and shapes of cell phones are increasingly abundant as well as convenient for users. Currently, the shape of a complete cell phone can be designed as a wristwatch in order to facilitate a user in carrying and using it. The circuit of the complete cell phone can be integrated into a wristwatch-shaped cover device so that the user can wear the cell phone on his/her wrist. However, the current designing mode has the following disadvantages.

Firstly, designing a product is difficult. Since the size of wristwatch is relatively smaller than that of the cell phone, the design and machining are difficult when all circuits of the cell phone are to be integrated into the cover in a wristwatch size to implement rich functions of the cell phone, which also increases the manufacture cost.

Secondly, it is difficult to be successful in business because the wristwatch as an accessory has become a fashion product and requires a low cost. Since the frequency for changing a wristwatch is much higher than the cell phone, if serving as an accessory in a wristwatch shape, the cell phone with a high cost may not be changed frequently and thus without the characteristic of free changing, and making the success in business difficult.

SUMMARY OF THE INVENTION

An embodiment of the present invention provides a cell phone peripheral device including:

a communication unit, for short-distance wireless communicating between said cell phone peripheral device and a cell phone;

a processing unit, for receiving information from said communication unit, processing the information to obtain and analyze data information;

a display unit, for receiving and displaying said data information.

Preferably, further including: a cover in an accessory shape for accommodating each unit of the cell phone peripheral device, and the cover is a device in a wristwatch shape comprising a wristwatch body and a wristwatch band; and the units of said cell phone peripheral device are set on in an alternative way: each unit is set on the wristwatch body; or some units of the cell phone peripheral device are received in the wristwatch boy, and other units of the cell phone peripheral device are set on the wristwatch band.

An embodiment of the present invention also provides a method for a cell phone perpheral device communicating with a cell phone, including:

receiving information from the cell phone by way of short-distance wireless communication;

processing the information to obtain and analyze data information including calling information and calling content; and displaying, by the cell phone peripheral device, the data information.

Preferably, the method further comprises: receiving voice or data information or an operating instruction from an user and transmitting the voice or data information or the operating instruction to the cell phone by way of short-distance wireless communication.

Preferably, the method further comprises the cell phone transmitting the voice or data information to the cellular network, or perform an operation corresponding to the operating instruction.

Preferably, further including: transmitting a handshake message to the cell phone or receiving a handshake message from the cell phone; if the handshake message is not transmitted or received successfully, or error bits of a checkout frame contained in said handshake signal exceed a set value, giving, by the cell phone or/and cell phone peripheral device, an alarm to prompt a user.

An embodiment of the present invention further provides a communication terminal, including: a first communication unit for communicating with a cellular network, a processing, unit, and a first input/output unit, and characterized by further including: a second communication unit, for transmitting voice and data information between the processing, unit and the first input/output unit by way of short distance wireless communication.

It can be seen from the above that, the cell phone peripheral device according to the present invention implements some functions of a cell phone, and implements the communications between itself and the cell phone and the communications between itself and the cellular network through the cell phone. Since the cell phone peripheral device just implements some functions of a cell phone, a complicated integrated circuit is needless. The manufacturing of the cell phone peripheral device therefore is simple and its cost is low. Moreover, the cell phone peripheral device can be applied to an accessory in a small size, for example, combined with a wristwatch, a bracelet and the like, to thereby be spread as an accoutrement with the communication function. Further, if desiring to update the accoutrement with the communication function, the subscriber just needs to replace the accoutrement including the cell phone peripheral device other than replace the whole cell phone. The cost thus is low.

DETAILED DESCRIPTION OF THE INVENTION

In order to explain the objects, technical solutions and advantages of the present invention more clearly, embodiments of the present invention are presented in detail accompanying with the drawings hereinafter.

Figure 1:
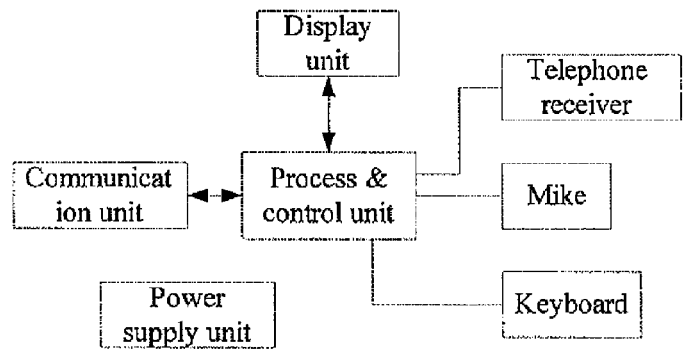
FIG. 1 shows the principle of cell phone peripheral device in accordance with an embodiment of the present invention.

According to the principle of cell phone peripheral device in accordance with an embodiment of the present invention as shown in FIG. 1, the cell phone peripheral device includes a display unit, a communication unit, and a processing unit, the communication unit is provide a short-distance wireless communication between the cell phone peripheral device and the cell phone. The processing unit is connected to all other units is used for implementing help cooperation work of each unit, further receiving information from the communication unit, processing the information to obtain and analyze data information; then the display unit receives and displays the data information.

As shown in FIG. 1, the cell phone peripheral device further includes a keyboard unit, for inputting data information and transmitting the data information via the processing unit and the communication unit to the cell phone, or receiving a request from user for selecting functions, sending, receiving or refusing a call and transmitting the request to the cell phone via said processing unit and said communication unit, and also includes a voice input/output unit, for receiving voice information, and transmitting the voice information to the processing unit, then the processing unit receives and transmits the voice information through communication unit to the cell phone, also the processing unit receives the voice information through communication unit and transmits the voice information to said voice input/output unit for playing. For example, the voice input/output unit is composed of a telephone receiver and a mike The cell phone peripheral device, referring to the FIG. 1, further includes a local power unit. The local power unit supplies power for other units and is adaptive for providing power for the cell phone through an interface. And the local power unit may accommodating one or more normal batteries or rechargeable batteries.

Also, a cover in an accessory shape is for accommodating each unit of the cell phone peripheral device. For example, the cover can be a device in a wristwatch shape comprising a wristwatch body and a wristwatch band; and the units of said cell phone peripheral device are set on in an alternative way:
each unit is set on the wristwatch body; or
some units of the cell phone peripheral device are received in the wristwatch boy, and other units of the cell phone peripheral device are set on the wristwatch band.

Specifically, the communication unit is utilized to implement the wireless communications between the cell phone peripheral device and the cell phone. The precondition of implementing the function of communication unit is that a wireless receiving/transmitting chip which is the same as the one adopted in the cell phone side is adopted by the communication unit. For example, if the cell phone is a conventional cell phone with the Bluetooth function, the communication unit adopts the Bluetooth chip and the connection protocol between the communication unit and the cell phone is the standard Bluetooth protocol, without modifying the hardware of cell phone. As another example, if the cell phone has the infrared transmission function, the communication unit adopts an infrared chip. It is easy to appreciate that the communication unit can be other types of wireless communication devices such as traditional AM modulation module, FM modulation module and the like. Some current cell phones have the function of receiving FM. If an FM transmitting chip is integrated into the cell phone, the cell phone can support the transmitting function as well. For example, when the Bluetooth chip of cell phone is replaced by the AM or FM receiving/transmitting chip, the communication unit can adopt the AM or FM receiving/transmitting chip to implement the wireless communications with the cell phone peripheral device.

Figure 2:
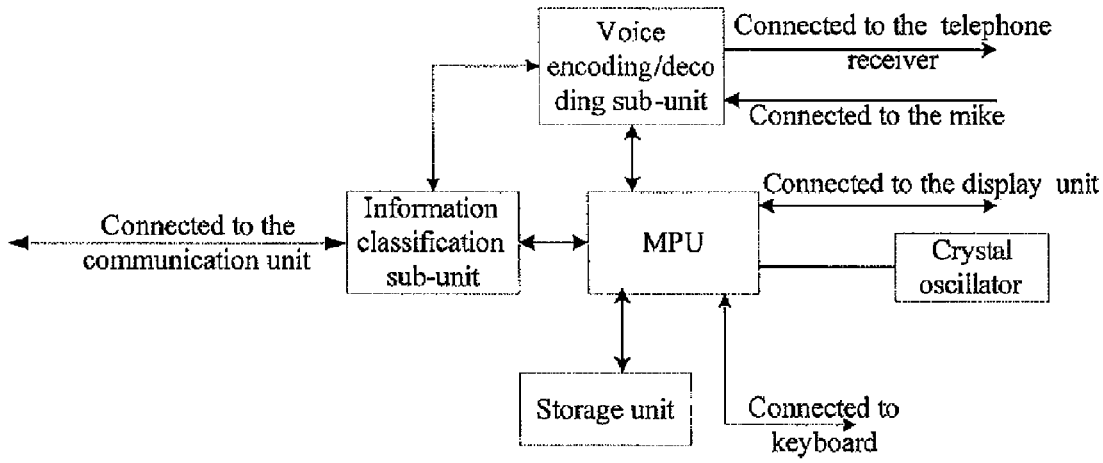
FIG. 2 shows the principle of a processing unit of the cell phone peripheral device in accordance with an embodiment of the present invention.

The processing unit is for helping the cooperation of all units and processing information. According to the principle of a processing unit of the cell phone peripheral device as shown in FIG. 2, the processing unit includes an information classification sub-unit, a center processing unit like an MPU, and a storage unit. The information classification sub-unit can be implemented by a multiplexing/de-multiplexing chip and is used to obtain data information from voice information, namely obtaining data information from the information received by the communication unit from the cell phone and transmitting the data information, or receiving information to the communication un it and transmitting the received information to the communication unit; the center processing unit, is used for transmitting the data information received from the information classification sub-unit to the display unit for displaying, and transmitting the input information received from the keyboard unit to the information classification sub-unit; and the storage unit is used for storing data, programs and processing results. And as shown in FIG. 2, a voice encoding/decoding sub-unit is also provided, and which is coupled to the voice input/output unit, for processing voice information, that is, encode or decode the voice information; and the information classification sub-unit obtains voice information from the information received by the communication unit, transmits the voice information to the voice encoding/decoding sub-unit and processes the received information from the voice encoding/decoding sub-unit and transmits processed information to the communication unit.

From the above structure of the cell phone peripheral device, the central processing unit, like the MPU, is for helping the cooperation of all sub-units, and implementing the timing function associated with a crystal oscillator. The crystal oscillator, for counting and providing a timing function can be provided in the processing unit or directly provided in the cell phone peripheral device.

The working principle of the cell phone peripheral device in accordance with an embodiment of the present invention is illustrated hereinafter.

The communication unit communicates with the cell phone. The processing unit processes the information received from the communication unit to distinguish voice information from data information; analyze and display data information by the display unit; decode, recover and transmit voice information from the cell phone to the phone receiver; collect, encode and transmit the voice from the mike to the cell phone through the communication unit. The user needn't take out the cell phone during the whole procedure.

Therefore, the cost of the cell phone peripheral device is low and the cell phone peripheral device is suitable for being set in an accessory cover to serve as a fashionable accessory. Further, the cell phone peripheral device can implement communications with the cell phone and the cellular network.

According to the above working principle, when the cell phone has an incoming call or receives other information, the information will be transmitted, through the wireless connection between the cell phone and the cell phone peripheral device, to the cell phone peripheral device and displayed, which facilitates the user's recognition. If the user is unwilling to answer tile incoming call, he/she can reject the call through the keystroke of the cell phone peripheral device. Moreover, the user can receive such data information as a short message through the cell phone peripheral device. When receiving the short message, the cell phone transmits the short message to the cell phone peripheral device for displaying. Optionally the user may check the short message on the cell phone by pressing the acception key on the cell phone peripheral device.

An embodiment of the present invention also provides a method for the cell phone peripheral device communicating with the cellular network. The communication pattern between the cell phone and the cellular network is not changed. And the communication between the cell phone peripheral device and cell phone can be divided into a process for transmitting information and a process for receiving information, which are illustrated hereunder.

The process for transmitting information includes the following steps. The cell phone peripheral device accepts the voice information inputted through its mike and the data information inputted through its keyboard unit. Then, the cell phone peripheral device transmits, through its communication unit, the information to the cell phone after decoding and processing the voice information and data information by its processing unit. And then, the cell phone transmits the information to the cellular network.

The process for receiving information includes the following steps. The cellular network transmits information to the cell phone. Then, the cell phone peripheral device receives, through its communication unit, the information transmitted from the cell phone. The cell phone peripheral device then processes and decodes, through its processing unit, the information to acquire voice information and data information. Respectively, the cell phone peripheral device transmits, through its telephone receiver, to the user the voice information, and transmits the data information to its display unit for displaying.

As described above, the processing unit may implement the timing function by dividing frequency according to the counting executed for the internal crystal oscillator. For this, a method for adjusting the time of a cell phone peripheral device is correspondingly provided according to an embodiment of the present invention. During the communications between the cell phone peripheral device and the cell phone, the cell phone peripheral device adjusts its time according to the tine of cell phone. While the cell phone acquires the standard time of system from the CDMA network, the accuracy of time is thus assured. The specific process includes the following steps.

First, the cell phone peripheral device receives, through the communication unit, the standard time information sent from the cell phone. Then, the processing unit of the cell phone peripheral device detects whether the current time of the cell phone peripheral device is consistent with the received standard time information, If "no", the processing unit changes the current time into the received standard time and display it on the display unit.

The adjustment function of activating time is implemented by the cell phone initiatively issuing the standard time information at a specified time (for example, once a day), or the cell phone peripheral device sending a request for adjusting time at a specified time. When receiving the request, the cell phone acquires the standard time from the network and sends it to the cell phone peripheral device.

The cell phone peripheral device can be notified of the time of cellular network by the cell phone to implement an adjusting time function, thereby assuring the accuracy of the time provided by the cell phone peripheral device.

According to the embodiment of the present invention, the cell phone and the cell phone peripheral device in the wristwatch shape can be used separately. During short distance communications, one user may use the cell phone; the other may use the cell phone peripheral device in the wristwatch shape. The two users can call each other or communicate through other information (a short message) without using the cellular network, e.g. when the users are playing out of town, according to the embodiment of the present invention, the temporary short distance communications are supported, if there is no cellular network. The cell phone and the cell phone peripheral device communicate with each other through the wireless communications therebetween. The difference between this method and the above method for communications between the cell phone peripheral device and the cellular network is that the cell phone does not communicate with the cellular network but directly displays the information received from the cell phone peripheral device on the cell phone. The information transmitted from the cell phone to the cell phone peripheral device is the information (including voice information and data information) inputted by the user other than the information from the cellular network.

The communication signal intensity of the cell phone peripheral device can be detected by the cell phone. The communication signal intensity is associated with the distance between the cell phone peripheral device and the cell phone. A program can be set in the cell phone to detect the signal intensity of the cell phone peripheral device in accordance with the embodiment of the present invention. If the signal intensity is reduced to a set threshold, it means that the distance between the cell phone peripheral device and the cell phone exceeds a certain length. The cell phone will send an alarm message to prompt the user. When a child carries the cell phone peripheral device, the grown-up's cell phone wilt alarm if the distance between the child and the grown-up carrying the cell phone reaches a certain length so as to prevent the child from being lost. Practically, the above program can be set on the cell phone peripheral device to measure the cell phone signal to implement an alarm.

Optionally, the cell phone and the cell phone peripheral device can transfer, through the short distance wireless communications, a handshake signal periodically. When the distance therebetween exceeds a certain length and therefore it is impossible to receive the handshake signal, the cell phone and/or cell phone peripheral device give(s) an alarm. Optionally, the cell phone and the cell phone peripheral device transfer, through the short distance wireless communications, the handshake signal including a checkout frame periodically, When the distance therebetween exceeds a certain length and therefore the error bits of the checkout frame exceeds a set value, the cell phone and/or cell phone peripheral device give(s) an alarm.

The signal can be monitored according to the relationship between distance and signal when the short distance communication is implemented, thereby monitoring the distance between the cell phone peripheral device and the cell phone to avoid being lost.

Figure 3:
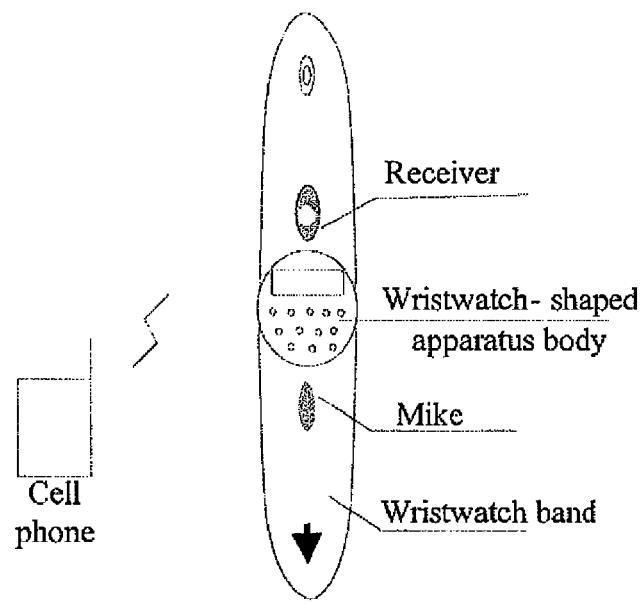
FIG. 3 is a schematic diagram illustrating the cell phone peripheral device located in a wristwatch shaped cover according to an embodiment of the present invention.
Figure 4:
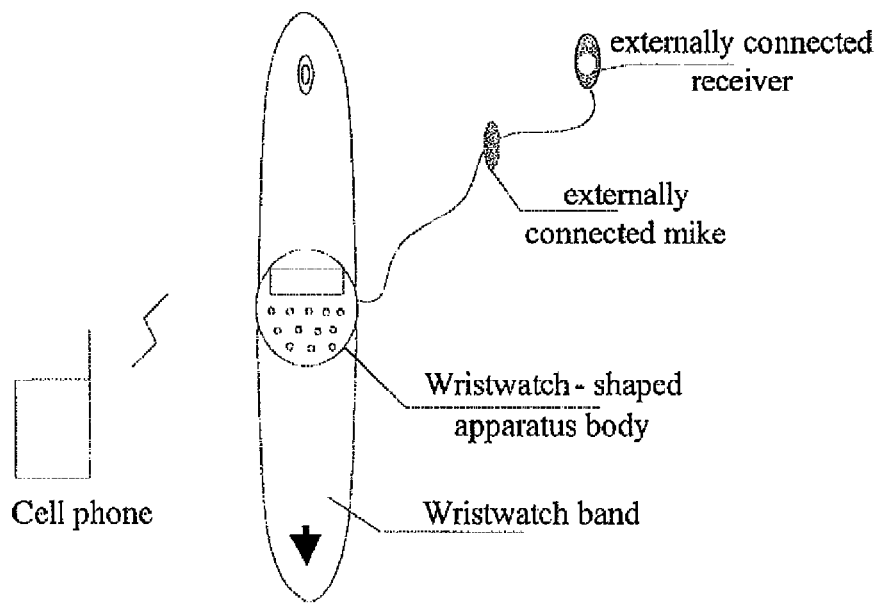
FIG. 4 is another schematic diagram illustrating the cell phone peripheral device located in the wristwatch shaped cover according to another embodiment of the present invention.

Several exemplary embodiments of the present invention are given hereinafter with reference to FIGS. 3 and 4. FIG. 3 is a schematic diagram illustrating the embedded telephone receiver and mike according to the present invention. In FIG. 3, the wristwatch includes a wristwatch band, and a wristwatch body including a display and a key board. The telephone receiver and mike are respectively set on the wristwatch band to improve the call performance. Practically, the telephone receiver and mike can be directly set on the wristwatch body. FIG. 4 shows that the telephone receiver jack and mike jack are set on the wristwatch body to support an externally connected earphone. It is easy to understand that the cell phone peripheral device according to the embodiment of the present invention can be widely applied to people's accessories such as a bracelet. When the cell phone peripheral device is integrated into such accessories as a bracelet and the like, some functions can be weakened, for example, voice processing part can be cut down while only information displaying is supported. The cost of the cell phone peripheral device is low and therefore the cell phone peripheral device is suitable for being set in an accessorizing cover to serve as an accessory.

It can be seen from the above that, the cell phone peripheral device according to the embodiment of the present invention independently has some functions of the cell phone. Since the cell phone peripheral device only implements some functions of the cell phone, the cell phone peripheral device doesn't need a complicated integrated circuit. Therefore, the manufacture of the cell phone peripheral device is easy and the cost is low. Moreover, the cell phone peripheral device can also be applied to accessories in small size. For example, combined with a wristwatch, a bracelet and the like, and thus can be promoted as an accessory with a communication function. Further, if desiring to update the accessory with the communication function, the user just needs to replace the accessory including the cell phone peripheral device other than replace the whole cell phone. The cost thus is low.

Though the present invention has been illustrated and described by referring to some preferred embodiments of the present invention, those skilled in the art should understand that various changes can be made in its form and detail without departing from the spirit or scope of the present invention defined in the appended claims.

What is claimed is:

1. A peripheral device for a mobile device, the peripheral device comprising:
   a transceiver configured for short-distance wireless communication between the peripheral device and the mobile device;
   a processor configured to process information received by the transceiver, to distinguish a voice component of the information from a data component of the information, and to analyze the data component;
   a display configured to display the analyzed data component;
   a local power source configured to supply power to the peripheral device;
   wherein the processor is configured to implement a timing function and the display is configured to display a time;
   wherein the peripheral device is a wristwatch;
   wherein a telephone receiver jack and a microphone jack are set on a body of the wristwatch to support an externally connected earphone; and
   wherein the processor is configured to implement the timing function by being configured to:
   receive time information from the mobile device without communicating with a cellular network the time information indicating a current time of the mobile device, and
   change the current time of the peripheral device when the current time of the peripheral device is not consistent with the current time of the mobile device.

2. The peripheral device according to claim 1, further comprising a keyboard, the keyboard configured to:
   receive user input from a user, and to transmit data corresponding to the user input to the mobile device via the processor and the transceiver;
   wherein the user input represents instructions to perform one of the group consisting of: utilize a function, send a call, receive a call, and refuse a call.

3. The peripheral device according to 1, further comprising a microphone configured to receive voice information;
   a speaker configured to play voice information;
   wherein the processor is further configured to receive the voice information from the microphone, to transmit the voice information to the transceiver, and to transmit the voice information to the speaker for playing.

4. The peripheral device according to claim 1, wherein the transceiver adopts one of the group consisting of: a Bluetooth chip, an infrared chip, an AM modulation module, and an FM modulation module.

5. The peripheral device according to claim 1, wherein the display is configured to display the time according to the time information obtained from the mobile device when the current time of the peripheral device is not consistent with the current time of the mobile device.

6. A method for communications between a peripheral device and a mobile device, comprising:
   receiving, by the peripheral device via short-distance wireless communication, information from the mobile device;
   processing, by the peripheral device, the information to distinguish a voice component of the information from a data component of the information,
   analyzing the data component;
   displaying the analyzed data component at a display;
   supplying, by a local power source, power for the peripheral device; and
   implementing a timing function by a processor of the peripheral device and displaying a time at the display;
   wherein implementing the timing function by the processor of the peripheral device and displaying the time at the display comprises:
   receiving, by the processor of the peripheral device, time information from the mobile device without communicating with a cellular network, wherein the time information indicates a current time of the mobile device,
   changing the current time of the peripheral device when the current time of the peripheral device is not consistent with the current time of the mobile device, and
   displaying the time;
   wherein a telephone receiver jack and a microphone jack are set on a body of the peripheral device to support an externally connected earphone, and
   wherein the peripheral device is a wristwatch.

7. The method according to 6, further comprising:
   receiving an operating instruction from a user; and
   transmitting the operating instruction to the mobile device by way of short-distance wireless communications.

8. The method according to claim 6, wherein, before the receiving the time information, the method further comprises:
   sending, by the peripheral device, a request for the time information to the mobile device.

9. The method according to claim 6, further comprising:
   detecting a wireless signal intensity; and
   issuing an alarm when the signal intensity is below a set threshold.

10. The method of claim 6, wherein the peripheral device is a wristwatch.

* * * * *

UNITED STATES PATENT AND TRADEMARK OFFICE
CERTIFICATE OF CORRECTION

PATENT NO. : 9,241,061 B2  
APPLICATION NO. : 11/625373  
DATED : January 19, 2016  
INVENTOR(S) : Ge et al.

Page 1 of 1

It is certified that error appears in the above-identified patent and that said Letters Patent is hereby corrected as shown below:

Title page, item (75), Inventors, line 1, city/county for inventor Jinchun Ge should read
-- Shenzhen, Guangdong (CN) --.

Title page, Item (75), Inventors, line 2, city/county for inventor Liang Liang should read
-- Shenzhen, Guangdong (CN) --.

Signed and Sealed this
Third Day of May, 2016

Michelle K. Lee
*Director of the United States Patent and Trademark Office*